United States Patent
Hrishekesh

(10) Patent No.: US 12,425,485 B2
(45) Date of Patent: Sep. 23, 2025

(54) SERVERS, SYSTEMS, AND METHODS FOR AUTOMATICALLY TRANSFORMING A MQTT TOPIC-PAYLOAD INTO ANY FORMAT

(71) Applicant: AVEVA SOFTWARE, LLC, Lake Forest, CA (US)

(72) Inventor: Karthik Hrishekesh, Irvine, CA (US)

(73) Assignee: Aveva Software, LLC, Lake Forest, CA (US)

( * ) Notice: Subject to any disclaimer, the term of this patent is extended or adjusted under 35 U.S.C. 154(b) by 0 days.

(21) Appl. No.: 18/371,605

(22) Filed: Sep. 22, 2023

(65) Prior Publication Data

US 2024/0106912 A1    Mar. 28, 2024

Related U.S. Application Data

(60) Provisional application No. 63/409,509, filed on Sep. 23, 2022.

(51) Int. Cl.
*H04L 67/55* (2022.01)
*G06F 16/25* (2019.01)
*H04L 67/12* (2022.01)

(52) U.S. Cl.
CPC ............ *H04L 67/55* (2022.05); *G06F 16/258* (2019.01); *H04L 67/12* (2013.01)

(58) Field of Classification Search
CPC ...... H04L 67/55; H04L 67/567; G06F 16/258
See application file for complete search history.

(56) References Cited

U.S. PATENT DOCUMENTS

| | | | |
|---|---|---|---|
| 11,294,941 B1 | 4/2022 | Sammer et al. | |
| 2007/0186150 A1* | 8/2007 | Rao | G06F 40/174 |
| | | | 715/764 |
| 2009/0319546 A1* | 12/2009 | Shaik | G06F 16/258 |
| 2010/0076783 A1* | 3/2010 | Mathur | G06F 21/6245 |
| | | | 707/738 |

(Continued)

FOREIGN PATENT DOCUMENTS

| | | | |
|---|---|---|---|
| CN | 106210084 A | 6/2019 | |
| CN | 113438233 A | 9/2021 | |
| WO | WO-2022161676 A1 * | 8/2022 | ............. H04L 67/12 |

*Primary Examiner* — David R Lazaro
*Assistant Examiner* — Mariegeorges A Henry
(74) *Attorney, Agent, or Firm* — Dergosits & Noah LLP; Todd A. Noah

(57) ABSTRACT

In some embodiments, the disclosure is directed to systems and methods for automatically generation multiple topic-payload with different formats using a single instance of a topic-payload hard coded into an MQTT client. In some embodiments, the system is configured to allow a user to alter the output of an MQTT client while the MQTT program is executing in a runtime environment. In some embodiments, the system includes instructions hard coded into the MQTT client that cause the client to communication with a transformation module not executing in the runtime environment. In some embodiments, instructions stored on the transformation module can be updated and referenced during a publish and/or subscribe operation. In some embodiments, the MQTT client includes one or more of a publisher, a broker, and a client.

13 Claims, 10 Drawing Sheets

(56) References Cited

U.S. PATENT DOCUMENTS

| | | | |
|---|---|---|---|
| 2010/0211580 A1* | 8/2010 | Sreekanth | G06F 8/10 707/756 |
| 2012/0233272 A1* | 9/2012 | Bedi | G06F 9/542 709/206 |
| 2020/0344189 A1 | 10/2020 | Cui et al. | |
| 2021/0152639 A1 | 5/2021 | Madden | |
| 2022/0400158 A1* | 12/2022 | Cosentino | H04L 67/565 |

* cited by examiner

```
In [11]: topics = {'House/sensor1' : ['ON', 'OFF'], 'House/sensor2' : ['Slow', 'Medium', 'Fast']}
for k,v in topics.items():
    print(f'Topic - {k} can have the following payload values - {v}')

Topic - House/sensor1 can have the following payload values - ['ON', 'OFF']
Topic - House/sensor2 can have the following payload values - ['Slow', 'Medium', 'Fast']
```

FIG. 1

MULTIPLE TOPICS, SMALLER MESSAGE PAYLOAD:

Topic: house/living-room-light, house/bed-room-fan, ...
Message Payload: On or Off
Message Payload: Slow, Medium, Fast

```
{"topic":
  [
    {
      "topic1" : "house/living-room-light", "msg_payload":
      [
        {"value1": "On"}
        {"value2": "Off"}
      ]
    }
    {
      "topic2" : "house/bed-room-fan", "msg_payload":
      [
        {"value3": "Slow"}
        {"value4": "Medium"}
        {"value5": "Fast"}
      ]
    }
  ]
}
```

SINGLE TOPIC, LARGER MESSAGE PAYLOAD:

Topic: house
Message Payload:
  ("living-room-light": "On")
  ("living-room-light": "Off")
Message Payload:
  ("bed-room-fan": "Slow")
  ("bed-room-fan": "Medium")
  ("bed-room-fan": "Fast")

```
{"topic": "house", "msg_payload":
  [
    ("value1": ("living-room-light": "On")
    ("value2": ("living-room-light": "Off")
    ("value3": ("bed-room-fan": "Slow")
    ("value4": ("bed-room-fan": "Medium")
    ("value5": ("bed-room-fan": "Fast")
  ]
}
```

FIG. 2

SERVERS, SYSTEMS, AND METHODS FOR AUTOMATICALLY TRANSFORMING A MQTT TOPIC-PAYLOAD INTO ANY FORMAT

CROSS-REFERENCE TO RELATED APPLICATION

This application claims priority and benefit of U.S. Provisional Application No. 63/409,509, filed on Sep. 23, 2022, entitled "SERVERS, SYSTEMS, AND METHODS FOR A GENERIC MQTT PUBLISHER," the contents of which are incorporated herein by reference in their entirety.

BACKGROUND

Message Queuing Telemetry Transport (MQTT) publishers and MQTT subscribers are tightly coupled. An MQTT publisher from vendor 'X' that publishes information using a certain topic namespace and message payload can communicate only with MQTT subscribers that understand the same topic namespace and message payload (generally referred to herein as topic-payload) format. Originally developed for the oil and gas industry, today, MQTT is widely used in a large variety of use cases and industries—automotive, logistics, manufacturing, smart home, consumer products, and transportation to name a few.

MQTT includes a lightweight, publish-subscribe industry standard network protocol that is configured to transport messages between devices. The MQTT architecture includes two types of systems: clients and brokers. A broker includes a server that communicates with the client. When the broker receives communications from one or more clients it then sends those communications to one or more other clients. In some embodiments, each client acts as a publisher, a subscriber, or both. In some embodiments, one or more clients do not communicate directly with each other. In some embodiments, one or more clients only communicate with brokers. In some embodiments, each client is configured to subscribe (i.e., register), to topics stored on a broker. In some embodiments, when another client publishes a message on a subscribed topic, the broker forwards the message to any client that subscribes to that topic.

An MQTT platform (including the one that forms part of the system described herein according to some embodiments) typically includes a gateway which includes software running on a client computer and is configured to receive signals from one or more sensors. The gateway is configured to associate the sensor name (e.g., topic) with the sensor value (e.g., payload) in a topic-payload format. In some embodiments, the gateway includes software configured to execute a runtime environment for the publisher, which generates a topic-payload format that includes the sensor name and/or associated data. There is no standard for this format, but both the publisher (e.g., gateway) and subscriber (e.g., SCADA) must establish a matching format in order for the subscriber to receive the information. In some embodiments, the publisher uses the topic to identify the location of the topic-payload combination on a broker. The subscriber sends a signal to the broker that request information on the topic. In response, the broker sends the information payload in a message associated with that topic to the subscriber. The payload may be a value, string, or command. If the topic requested from the subscriber does not match perfectly with the topic sent from the publisher, the subscriber will not receive the information. In some embodiments, this relationship is bi-directional as some clients are configured to send (i.e., publish) topic-payloads and receive (i.e., subscribe) topic-payloads.

In the prior art, it is necessary to "hard code" the syntax or format for a topic-payload relationship between a publisher and subscriber on each client. The syntax needs to be known ahead of time and defined on the publisher and/or subscriber platforms. Only then can publishers and subscribers communicate with each other. Once defined, the only way to adjust or change a topic-payload format is to change the format in the client coding (subscriber and/or publisher) and send out a system update. In an industrial setting, this process can become a cumbersome and time consuming process as every time a new subscriber is added for a publisher, the new subscriber must be coded to receive the topic-payload and/or the publisher must be coded to send the message payload, and then a system update must be executed before the publisher and subscriber can communicate.

The MQTT system is widely used in industry because the topic-payload the platform creates is very low data and is effective even using low power and/or low reliability networks. However, the simplicity of the system also requires manual coding for each type of topic-payload which is time consuming and does not allow for editing at runtime to enable addition of a new subscriber topic-payload format. Therefore, a need exists for a system configured to enable an MQTT publisher to communicate with any MQTT subscriber without requiring a change in the hard coding and/or executing a system update.

SUMMARY

In some embodiments, the disclosure is directed to a system for enabling communication between Message Queuing Telemetry Transport (MQTT) publishers and MQTT subscribers using different communication formats. In some embodiments, the system comprises one or more computers comprising one or more processors and one or more non-transitory computer readable media, the one or more non-transitory computer readable media having program instructions stored thereon that when executed cause the one or more computers to implement one or more algorithm steps.

Some embodiments include a step to receive, by the one or more processors, a first topic-payload format comprising a first MQTT topic format and a first MQTT payload format a first format. Some embodiments include a step to execute, by the one or more processors, a send command configured to send the first MQTT topic and the first MQTT payload to a transformation module. Some embodiments include a step to execute, by the one or more processors, a transformation operation in the transformation module configured to create a second topic-payload format using the first topic-payload format.

In some embodiments, the system comprises one or more publishers, one or more subscribers, and one or more brokers. In some embodiments, a first publisher is configured to send the first topic-payload to the broker in the first topic-payload format. In some embodiments, a first subscriber is configured to subscribe to the broker in the first topic-payload format for the first topic-payload. In some embodiments, the broker is configured to send the first topic-payload to the first subscriber in the first topic-payload format.

In some embodiments, the first publisher comprises a first publisher format module configured to enable a user to define the first topic-payload format for sending the first topic-payload. In some embodiments, the first publisher format module cannot be modified while the first publisher is executing in a first publisher runtime environment. In some embodiments, the first publisher format module comprises transformation code configured to send the first topic-payload format to the transformation module. In some embodiments, the transformation module does not execute in the first publisher runtime environment. In some embodiments, the transformation module comprises a transformation file configured to be modified while the first publisher is executing in the first publisher runtime environment. In some embodiments, the transformation file is configured to execute the transformation operation.

In some embodiments, the first publisher is configured to send the first topic-payload comprising the first topic-payload format and the second topic-payload comprising the second topic payload format to the broker. In some embodiments, the system comprises a first subscriber and a second subscriber. In some embodiments, the first subscriber comprises a first format module that cannot be modified while the first subscriber is executing in a first subscriber runtime environment. In some embodiments, the second subscriber comprises a second format module that cannot be modified while the second subscriber is executing in a second subscriber runtime environment. In some embodiments, the first format module is configured to receive the first topic-payload in the first topic-payload format from the broker. In some embodiments, the second format module is configured to receive the second topic-payload in the second topic-payload format from the broker.

In some embodiments, the first subscriber comprises a subscriber format module configured to enable a user to define the first topic-payload format for receiving the first topic-payload. In some embodiments, the first subscriber format module cannot be modified while the first subscriber is executing in a first subscriber runtime environment. In some embodiments, the first subscriber format module comprises transformation code configured to send the first topic-payload format to the transformation module. In some embodiments, the transformation module does not execute in the first subscriber runtime environment. In some embodiments, the transformation module comprises a transformation file configured to be modified while the first subscriber is executing in a runtime environment. In some embodiments, the transformation file is configured to execute the transformation operation.

In some embodiments, the system comprises a first publisher and a second publisher. In some embodiments, the first publisher comprises a first format module that cannot be modified while the first publisher is executing in a first publisher runtime environment. In some embodiments, the second publisher comprises a second format module that cannot be modified while the second publisher is executing in a second publisher runtime environment. In some embodiments, the first format module is configured to send the first topic-payload in the first topic-payload format to the broker. In some embodiments, the second format module is configured to send the second topic-payload in the second topic-payload format to the broker. In some embodiments, the transformation operation is configured to enable the first subscriber to subscribe to the broker in the first topic-payload format and the second topic-payload format.

In some embodiments, the broker comprises a broker format module comprising transformation code configured to send the first topic-payload format to the transformation module. In some embodiments, the transformation module comprises a transformation file configured to be modified while the broker is executing in a runtime environment. In some embodiments, the transformation file is configured to execute the transformation operation. In some embodiments, the transformation operation is configured to enable the broker to send the first topic-payload in first topic-payload format and the second topic-payload in the second topic-payload format to the subscriber.

In some embodiments, the subscriber comprises a first subscriber and a second subscriber. In some embodiments, the first subscriber comprises a first subscriber format module that cannot be modified while the first subscriber is executing in a first subscriber runtime environment. In some embodiments, the second subscriber comprises a second subscriber format module that cannot be modified while the second subscriber is executing in a second subscriber runtime environment. In some embodiments, the first subscriber format module is configured to receive the first topic-payload in the first topic-payload format from the broker. In some embodiments, the second subscriber format module is configured to receive the second topic-payload in the second topic-payload format from the broker. In some embodiments, the transformation operation is configured to enable the first subscriber to subscribe to the broker in the first topic-payload format. In some embodiments, the transformation operation is configured to enable the second subscriber to subscribe to the broker in the second topic-payload format.

In some embodiments, the transformation operation comprises a parsing operation comprising one or more steps. Some embodiments include a step to identify, by the one or more processors, one or more topics and one or more payloads in the first topic-payload format. Some embodiments include a step to parse, by the one or more processors, the topic-payload format into the one or more topics and the one or more payloads. Some embodiments include a step to generate, by the one or more processors, the second topic-payload format using the parsed first topic-payload format.

DRAWINGS DESCRIPTION

FIG. 1 shows a non-limiting transformation operation including parsing a topic payload according to some embodiments.

FIG. 2 illustrates an example of a first topic-payload format and a second topic payload format according to some embodiments.

DETAILED DESCRIPTION

In some embodiments, the system comprises a novel solution where any topic-payload format can be created at runtime by configuring the hard code in one or more of one or more of a publisher, a broker, and a subscriber which is executed at runtime to communicate with a transformation module. In some embodiments, the system enables an MQTT publisher to send any type of topic namespace and/or message payload that an MQTT subscriber expects to receive, and vice versa. Any generic reference to a client herein is a reference to functionality for the publisher, the broker, and/or the subscriber unless otherwise specified according to some embodiments.

To accomplish this enablement, some embodiments of the system presented herein includes transformation logic hard coded into the MQTT program executing on a client that when implemented causes the MQTT program to send a topic-payload with a first format to a transformation module. In some embodiments, the transformation module is external to the MQTT runtime environment, and/or is configured to create one or more new topic-payloads in specified formats instead of and/or in addition to any hard coded topic-payload formats. As used herein, hard code refers to code that cannot be modified while the MQTT program is executing in a runtime environment but may be altered offline and/or implemented by system update. In some embodiments, the transformation module includes a database and/or file comprising logic (e.g., parsing logic) configured to identify the topic and/or payload in the topic-payload format.

FIG. 1 shows a non-limiting transformation operation including parsing a topic payload according to some embodiments. In some embodiments, the parsing logic (also referred to as a script) is configured to parse the topic and/or payload from the first format to create a separated topic and/or separated payload. In some embodiments, the parsing logic is configured to generate one or more new topic-payload formats using the separated topic and/or the separated payload. In some embodiments, the transformation module is configured to return the one or more new topic-payload formats to the MQTT program and/or execute a publish and/or a subscribe operation. In some embodiments, the transformation module is configured to cause the client to publish the one or more new topic-payload formats instead of or in addition to one or more hard coded topic-payload format. FIG. 2 illustrates transforming a topic-payload format including multiple topics to a topic-payload format including a single topic according to some embodiments.

Figure 3:
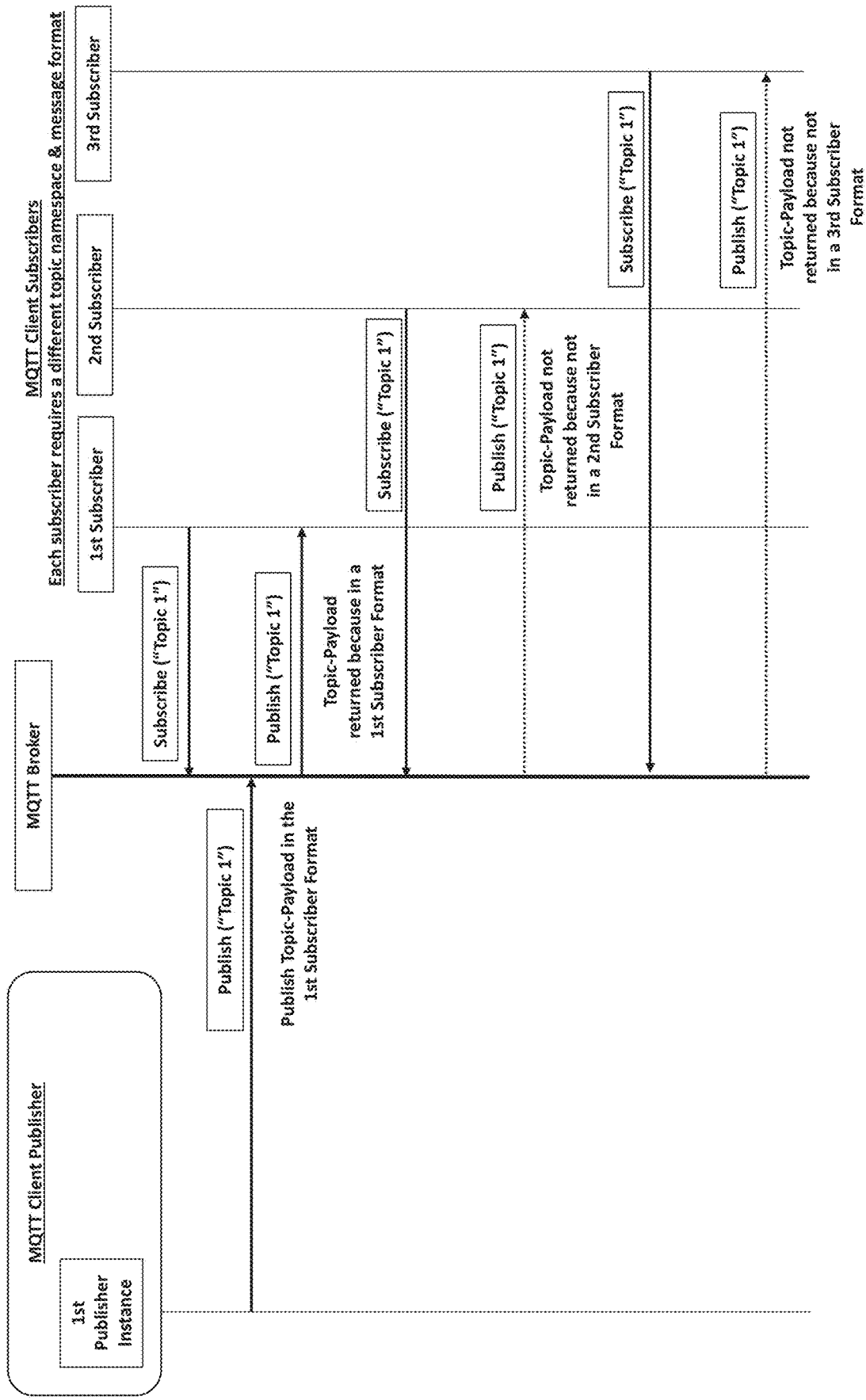
FIG. 3 illustrates the problem of multiple subscribers with different topic-payload formatting than the publisher according to some embodiments.

FIG. 3 illustrates the problem of multiple subscribers with different topic-payload formatting than the publisher according to some embodiments. In this non-limiting example, the MQTT client publisher is configured to publish in a single format from a first publisher instance executing in the MQTT client publisher runtime environment according to some embodiments. In some embodiments, the topic-payload ("topic 1") is published (i.e., sent) to the broker in a first format. In some embodiments, the first subscriber sends a request for topic 1 to the broker, and the broker returns the topic and/or message payload to the subscriber in the first format. In some embodiments, the first subscriber is able to successfully retrieve the payload because it is in the first format. In some embodiments, the second subscriber and the third subscriber are not able to successfully retrieve the topic-payload from the broker. These situations may occur because the subscriber topic format does not match the publisher topic format, the subscriber payload format does not match the publisher payload format, or some combination of the two.

In any event, these issues become a problem that increases at scale: when multiple subscribers are added with different formatting requirements than the publisher, either the publisher hard code must be changed, or the subscriber hard code must be changed. These changes require an update for the entire system which significantly taxes computer resources.

Figure 4:
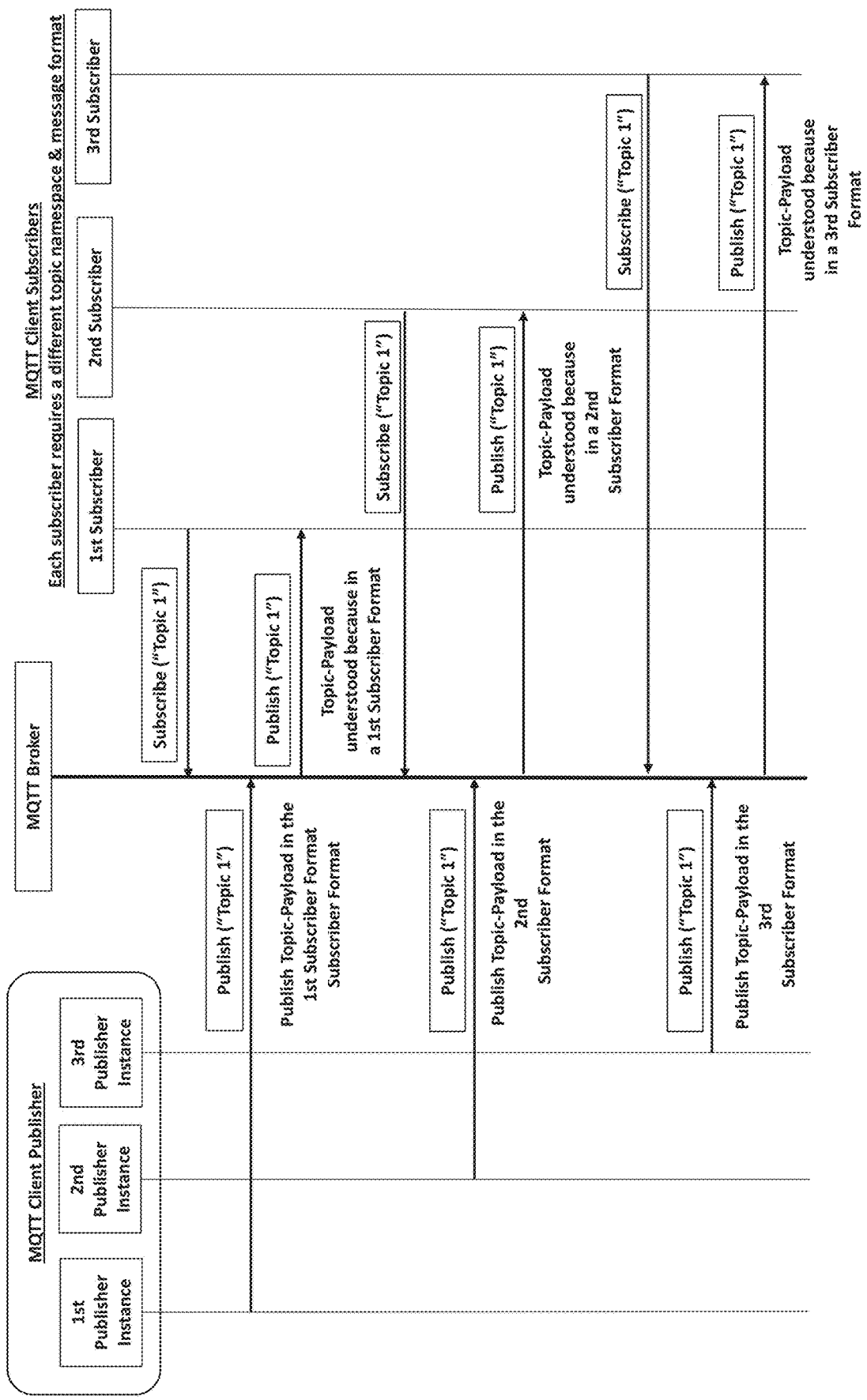
FIG. 4 illustrates the concept of creating new instances of publishers with different topic-payload formats as a solution according to some embodiments.

As shown in FIG. 4, some embodiments include creating multiple publisher instances inside a single publisher. In some embodiments, each publisher instance corresponds to a topic-payload format expected by one or more subscribers. However, this arrangement still requires a system update to execute.

Figure 5:
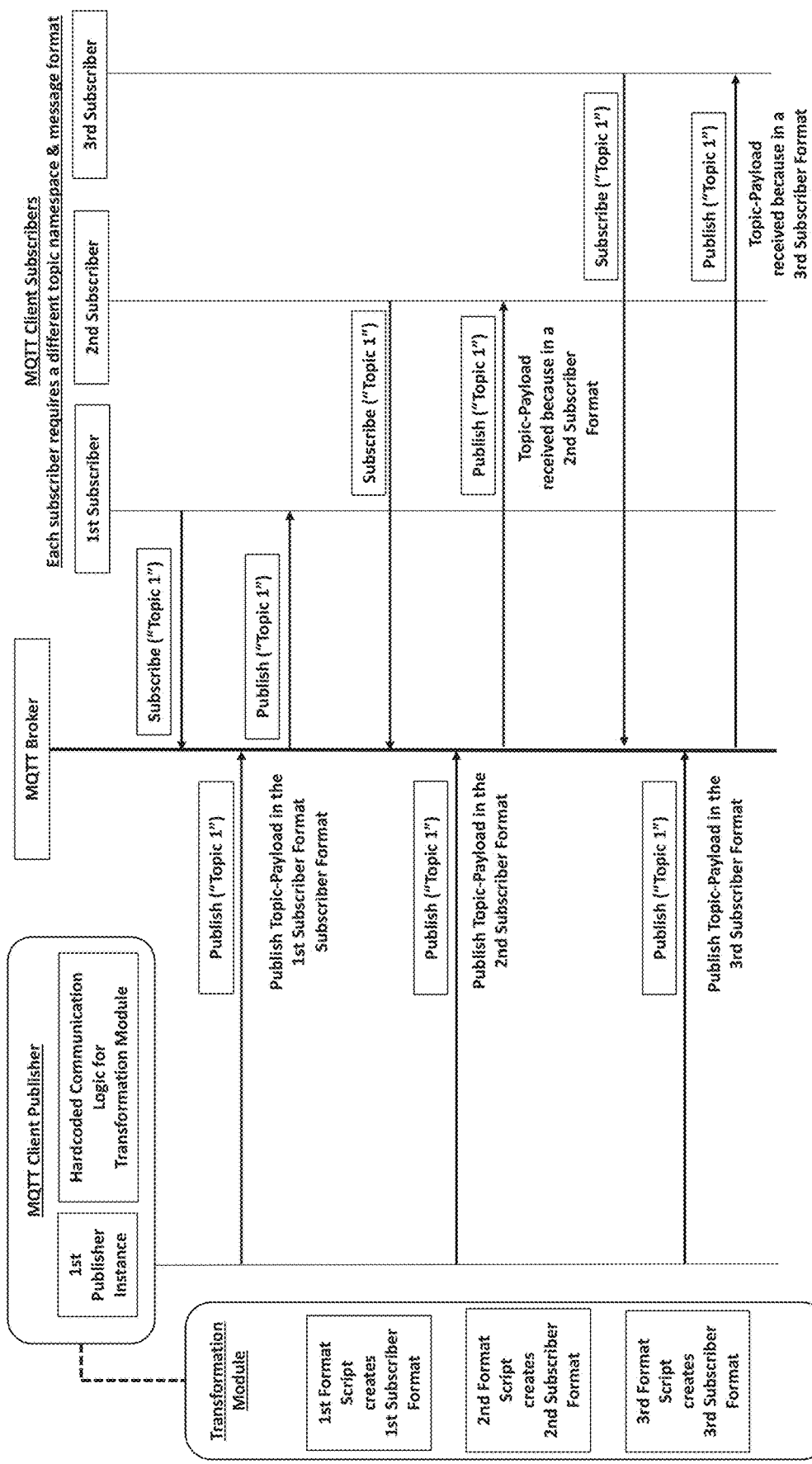
FIG. 5 depicts a publisher hard code including instructions to communicate with a transformation module according to some embodiments.

FIG. 5 depicts a publisher hard code including instructions to communicate with a transformation module according to some embodiments. In some embodiments, the transformation module comprises a plurality of topic-payloads in different formats that are returned in response to the communication. However, sending a single hard coded topic-payload to one or more parsing scripts stored in the transformation module has a number of advantages according to some embodiments. In some embodiments, by parsing a topic-payload that comprises multiple topics, payloads, or topic-payload nested combinations, the system is configured to automatically generate any combination of topic-payload formats specified by the transformation operation logic. As a non-limiting example, if a single topic-payload includes 10 topics, the system is configured to parse the single topic-payload to create 10 individual new topic-payload formats for publishing according to some embodiments. This parsing in some embodiments saves time because a user does not have to create each topic-payload in each topic-payload format. The parsing also saves computer resources as only the parsing logic needs to be saved instead of all the different formats, as the new formats are formed at runtime.

Another advantage according to some embodiments is that the formats can be created and/or modified at runtime because the transformation module used to store the transformation operation (e.g., parsing logic) is external to the runtime. In some embodiments, because the hard code in the publisher (e.g., gateway) references the transformation module, the transformation operation logic can be altered during publisher runtime. In some embodiments, once the changes are saved in the transformation module, the next iteration of hard code executed by the publisher references the transformation module with the altered transformation operation logic that now includes generating a new topic-payload in a new topic-payload format for a new subscriber. This enables anyone with access to the transformation module to add or delete subscribers without changing the MQTT program hard code in the publisher client or subscriber client.

Figure 6:
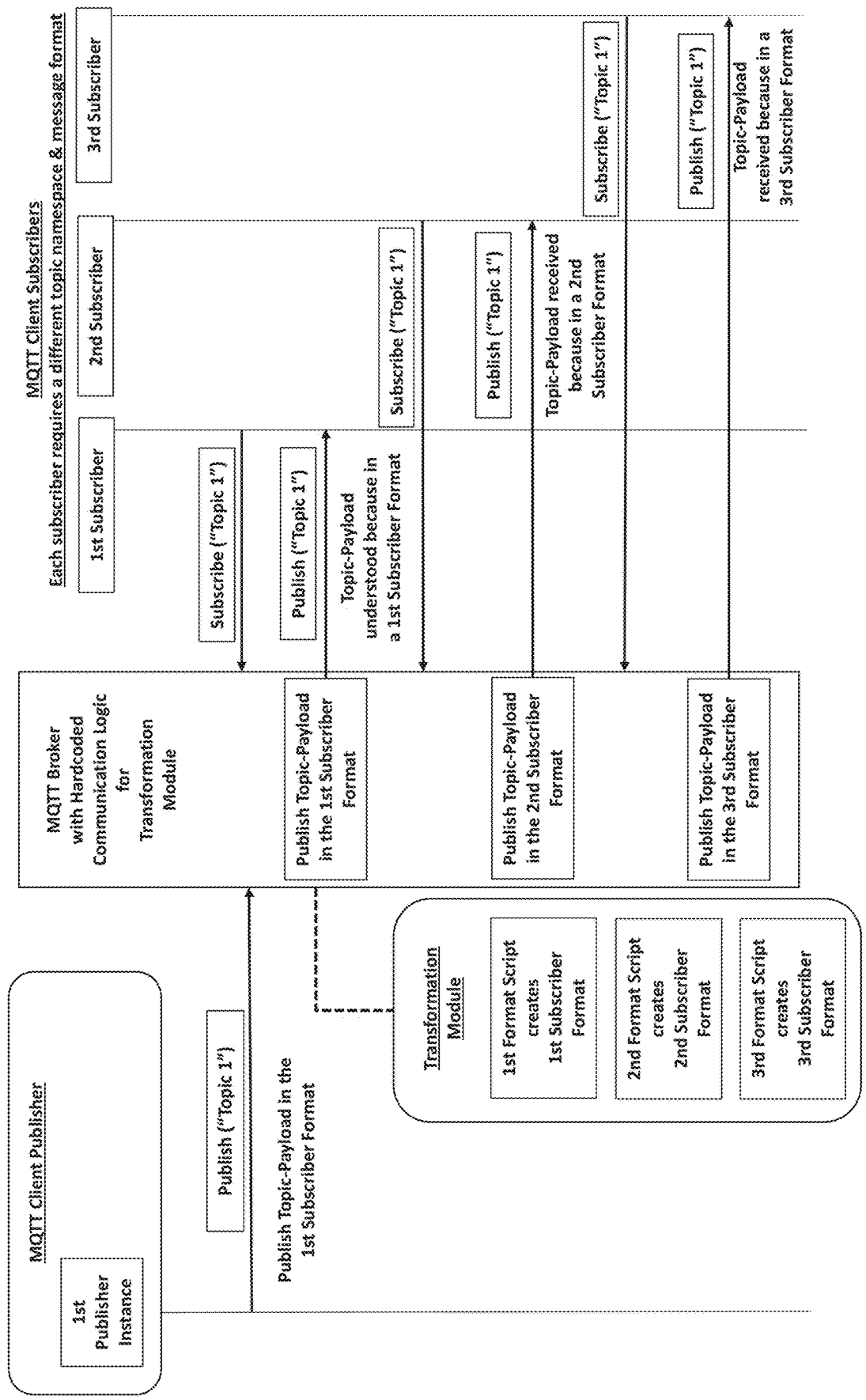
FIG. 6 illustrates an MQTT broker hard code including instructions to communicate with a transformation module according to some embodiments.

FIG. 6 illustrates an MQTT broker hard code including instructions to communicate with a transformation module according to some embodiments. In some embodiments, the broker is configured to receive the topic-payload ("topic 1") from the publisher, which is only publishing in a first subscriber format in this non-limiting example. In some embodiments, the broker is configured to send the received topic-payload to a transformation module. In some embodiments, the transformation module is configured to execute one or more transformation operations on the topic-payload. In some embodiments, the broker is configured to receive and/or store the one or more new topic-payloads in the one or more new topic-payload formats. In some embodiments, the broker is configured to send the one or more new topic-payloads to a subscriber in response to a request in the one or more new topic-payload formats.

Figure 7:
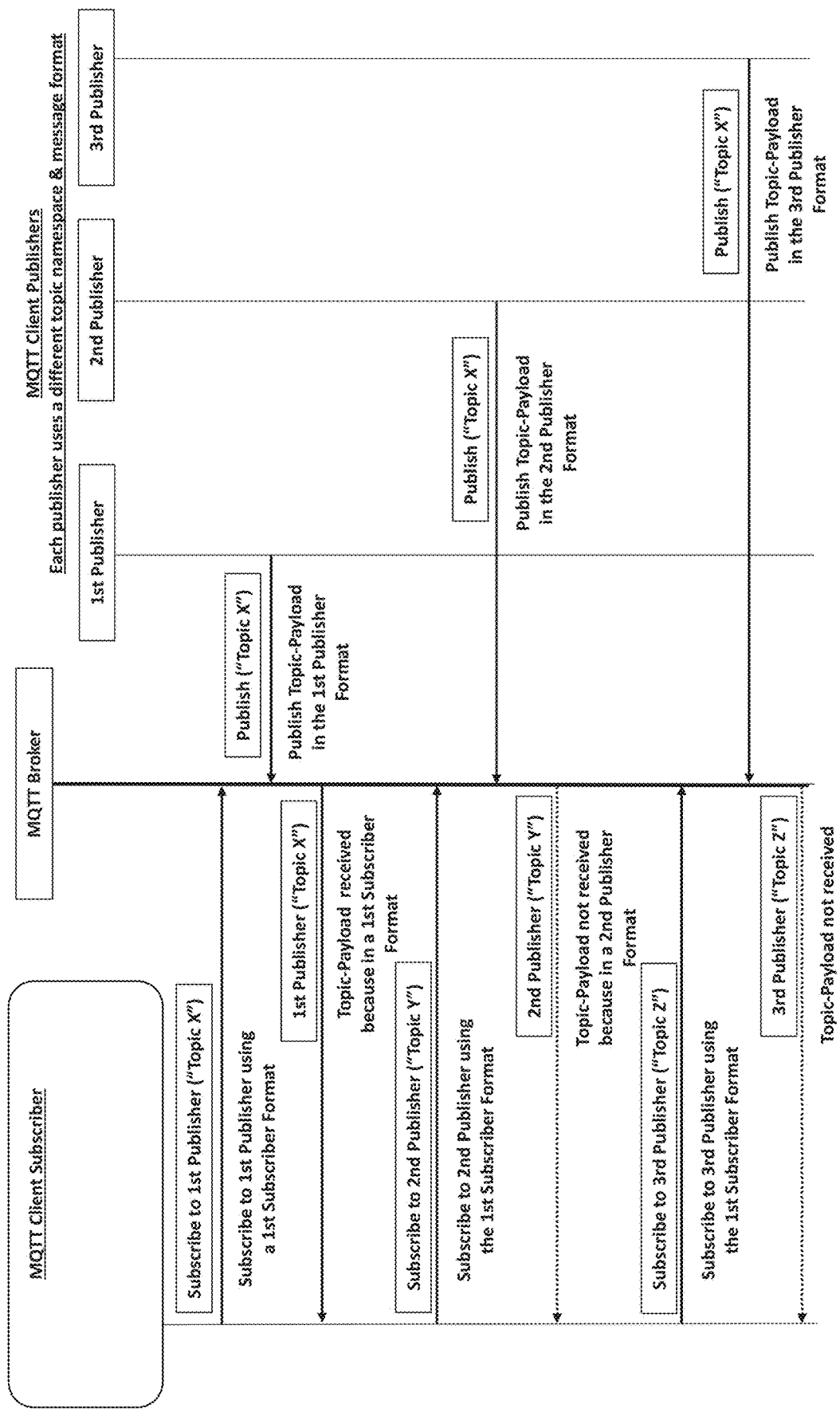
FIG. 7 shows the problem of multiple publishers with different topic-payload formatting than the subscriber according to some embodiments.

FIG. 7 shows the problem of multiple publishers with different topic-payload formatting than the subscriber according to some embodiments. Noting that any concept with respect to a publisher according to some embodiments can be applied to a subscriber as well, in this non-limiting example the subscriber is expecting all information published to the MQTT broker to be in a first subscriber format. However, the second publisher and the third publisher are using different formats (e.g., see FIG. 1).

Figure 8:
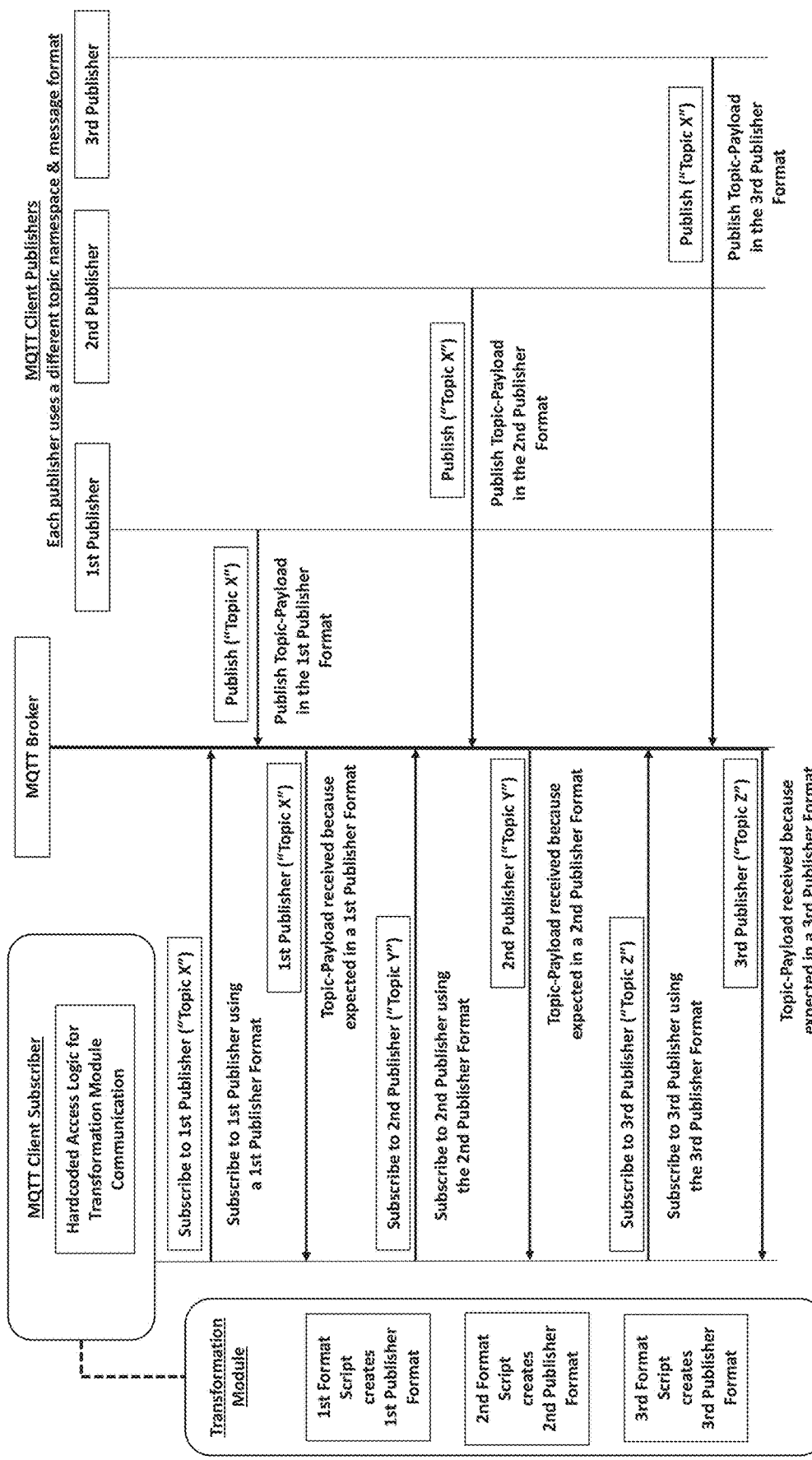
FIG. 8 depicts a subscriber hard code including instructions to communicate with a transformation module according to some embodiments.

FIG. 8 depicts a subscriber hard code including instructions to communicate with a transformation module according to some embodiments. In some embodiments, the communication instructions include sending a hard coded subscription to the transformation module. In some embodiments, the transformation module is configured to execute a transform operation on the hard coded subscription to create one or more publisher formats. In some embodiments, the transformation module is configured to return the one or more publisher formats to the MQTT subscriber program executing in the runtime environment. In some embodiments, the subscriber is configured to subscribe to each publisher on the broker in each publisher's respective format. In some embodiments, the respective topic-payloads are returned and processed because they are in the format the broker is expecting.

Figure 9:
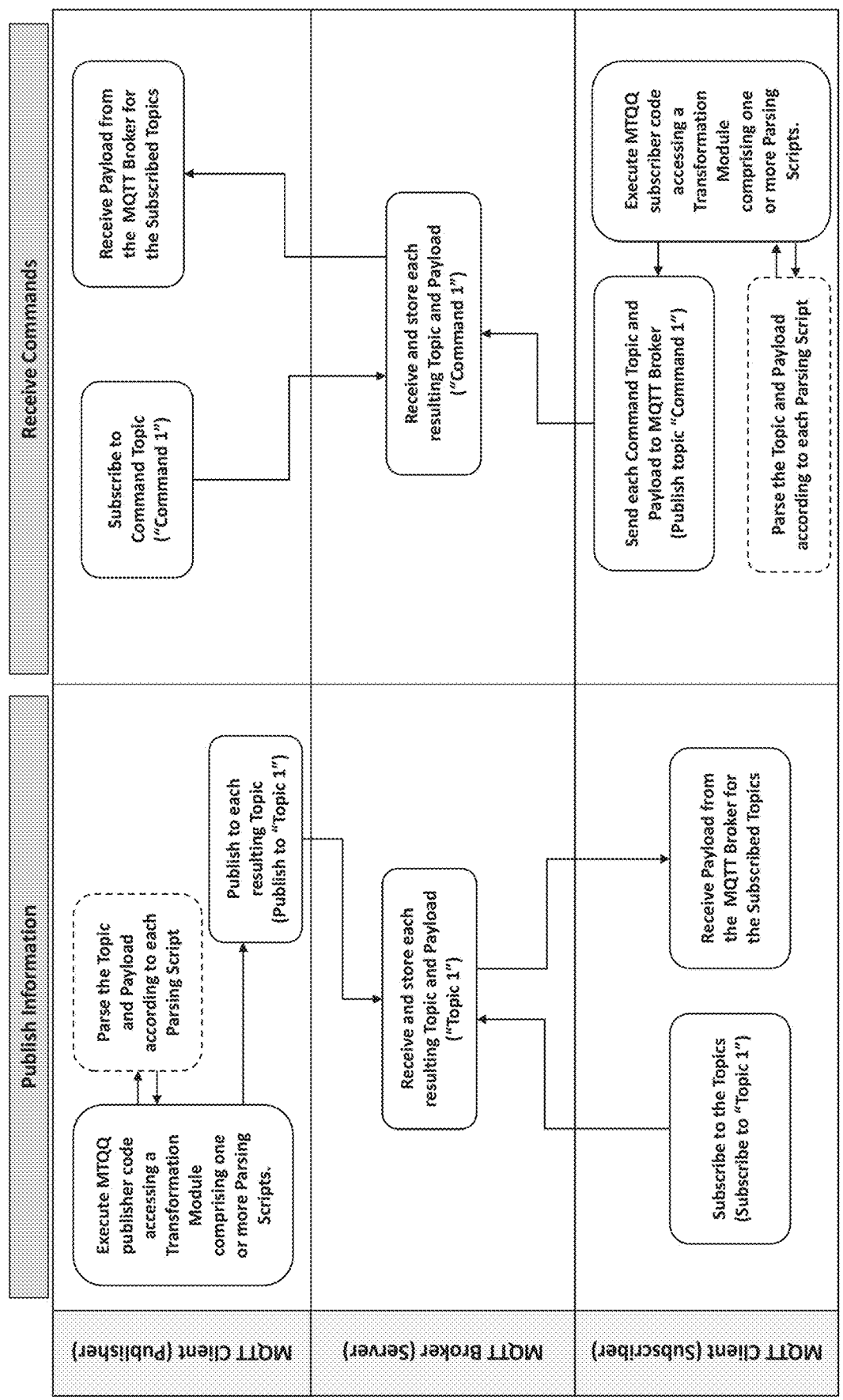
FIG. 9 illustrates an example algorithm flow for information and commands within the MQTT system according to some embodiments.

FIG. 9 illustrates an example algorithm flow for information and commands within the MQTT system according to some embodiments. As described above, hard code is executed on publisher (client) accessing the transformation module comprising the transformation operation logic, which in this non-limiting example according to some embodiments includes a parsing operation. In some embodiments, each generated topic-payload format is published to the broker. In some embodiments, the subscriber subscribes to the topic, and receives the topic-payload in the expected format.

In some embodiments, the system is configured to send commands through the MQTT system. Referring to FIG. 9, in some embodiments, the subscriber (acting as a publisher also in this instance) is configured to send a command in a first command format to the transformation module. In some embodiments, the transformation module is configured to execute a transformation operation configured to generate one or more command formats. In some embodiments, the subscriber is configured to send the one or more command formats comprising one or more topic-payloads to the broker. In some embodiments, the publisher (also acting as a subscriber) receives the commands in the correct format and executes the commands according to the payload.

In some embodiments, the system includes a format using XML or JSON to define the topic namespace and message payload structure. In some embodiments, the system includes a generic MQTT publisher configured to parse the format at runtime and form the topic namespace and message payload format on the fly, enabling the MQTT publisher to communicate with any MQTT subscriber. In some embodiments, the system is configured to decouple the MQTT publisher and MQTT subscriber which are linked by hard code, enabling an MQTT publisher to communicate with any other MQTT subscriber without altering the hard code.

In some embodiments, the system includes an MQTT publisher configured to read and resolve the format at runtime. In some embodiments, the system includes a format written using XML or JSON that is configured to define the topic namespace and message payload format for MQTT clients. In some embodiments, the system is configured to form a topic namespace and/or a message payload with the MQTT program is executing publishing and/or subscribing commands in a runtime environment. In some embodiments, the systems and methods described herein enable an MQTT publisher to communicate with different MQTT subscribers from different vendors irrespective of the underlying topic namespace and message payload format required by the vendors. For, example, in some embodiments, when a new subscriber subscribes to the topic, the transformation module can be updated with parsing instructions configured to create the format the subscriber expects.

In some embodiments, as illustrated in FIG. 1, creating a topic naming format can include putting as much information as possible in the topic field and/or putting as much information as possible in the message payload. In some embodiments, the system is configured to receive multiple generic topic-payloads and generate one or more topic-payload combinations. In some embodiments, topic payload combinations may include generating a new topic that includes one or more topics from the multiple generic topic-payloads, resulting in a consolidated number of topic-payload publishing actions, thereby saving computer resources. In some embodiments, the publisher and/or the subscriber reference the same transformation module.

As a non-limiting example of a MQTT topic namespace and message payload structure applied to a light switch, at a minimum the payload structure needs to publish its current state (i.e., ON or OFF) and respond to a command to change state. In some embodiments, the system is configured to accomplish this using the topic name and the message payload. In some embodiments, the topic name includes the topic name and/or information describing the message payload. As a non-limiting example, "sensor1" is a topic with a sensor name only, where "sensor1/status" is a topic that includes a sensor name and information about the type of data (e.g., status information). Therefore, a naming format would include a light switch configured to publish status information on a topic "light-switch/status" (or just "light-switch") and/or receive commands on "light-switch/set" according to some embodiments. In some embodiments, the message payload includes a value (e.g., ON or OFF).

In some embodiments, the message payload includes extra information other than the value. As a non-limiting example, the light switch is configured to publish on the topic "light-switch." In some embodiments, the system is configured to use a JSON encoded message payload. In some embodiments, a non-limiting example of a JSON encoded message payload includes {"status":"ON"} or {"status":"OFF"} for data, and/or {"set":"ON"} or {"set": "OFF"} for commands. In some embodiments, the system is configured to put information in the topic field and/or in the message payload.

In some embodiments, in a non-limiting example facility (e.g., building, house, manufacturing plant) with 10 sensors (e.g., temperature sensors, humidity sensors, door locks, light switches, etc.), the system is configured to execute a topic naming format where each sensor publishes on its own topic such as house/sensor1, house/sensor2 house/sensor10, as a non-limiting example. In some embodiments, if one or more sensors only publish a single value (e.g., ON, OFF, OPEN, CLOSED, TEMPERATURE, etc.), then the payload includes (just) that value. Therefore, a living room light switch would publish a topic "house/living-room-light" with a message payload "ON" or "OFF."

In some embodiments, a non-limiting example includes publishing a single topic and a sensor identification (ID) in the payload as a topic "house" with a JSON encoded message payload {"living-room-light":"ON"} or {"living-room-light":"OFF"}. In some embodiments, the system is configured to create a topic for the sensor (e.g., light switch) to receive commands.

In some embodiments, a non-limiting example includes a topic structure "house/living-room-light/cmd" "house/living-room-light/cmd" with a message payload of {"SET": "ON"} or {"SET":"OFF"} according to some embodiments. In some embodiments, another non-limiting example topic structure includes "house/living-room-light/set" with a message payload of ON or OFF. In some embodiments, another alternative supported by the system includes using the payload for the device and also encoding the command, where a non-limiting example include a topic "house" and payload {"living-room-light":{"SET":"ON"}} or {"living-room-light": {"SET":"OFF"}}.

In some embodiments, the MQTT systems and methods described herein comprise a lightweight messaging protocol for use in cases where clients (i.e., computer systems) need a small code footprint and are connected to unreliable networks or networks with limited bandwidth resources. In some embodiments, the MQTT systems and methods described herein are used for machine-to-machine (M2M) communication or Internet of Things types of connections.

Figure 10:
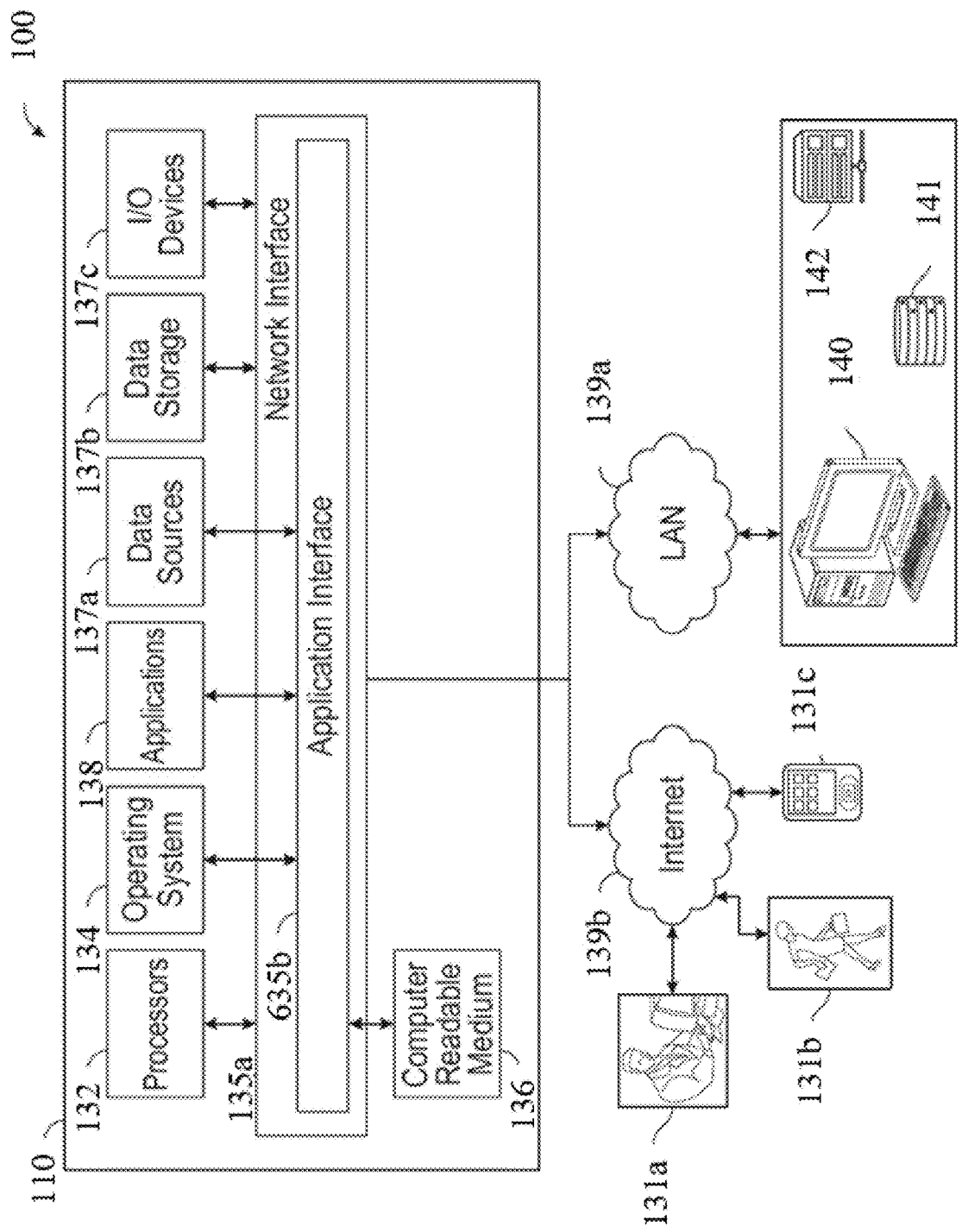
FIG. 10 illustrates a computer system enabling or comprising the systems and methods in accordance with some embodiments of the system.

FIG. 10 illustrates a computer system 110 enabling or comprising the systems and methods described herein in accordance with some embodiments. In some embodiments, the computer system 110 can operate and/or process computer-executable code of one or more software modules of the aforementioned system and method. Further, in some embodiments, the computer system 110 can operate and/or display information within one or more graphical user interfaces (e.g., HMIs) integrated with or coupled to the system.

In some embodiments, the computer system 110 can comprise at least one processor 132. In some embodiments, the at least one processor 132 can reside in, or coupled to, one or more conventional server platforms (not shown). In some embodiments, the computer system 110 can include a network interface 135a and an application interface 135b coupled to the least one processor 132 capable of processing at least one operating system 134. Further, in some embodiments, the interfaces 135a, 135b coupled to at least one processor 132 can be configured to process one or more of the software modules (e.g., such as enterprise applications 138). In some embodiments, the software application modules 138 can include server-based software and can operate to host at least one user account and/or at least one client account, and operate to transfer data between one or more of these accounts using the at least one processor 132.

With the above embodiments in mind, it is understood that the system can employ various computer-implemented operations involving data stored in computer systems. Moreover, the above-described databases and models described throughout this disclosure can store analytical models and other data on computer-readable storage media within the computer system 110 and on computer-readable storage media coupled to the computer system 110 according to various embodiments. In addition, in some embodiments, the above-described applications of the system can be stored on computer-readable storage media within the computer system 110 and on computer-readable storage media coupled to the computer system 110. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 110 can comprise at least one computer readable medium 136 coupled to at least one of at least one data source 137a, at least one data storage 137b, and/or at least one input/output 137c. In some embodiments, the computer system 110 can be embodied as computer readable code on a computer readable medium 136. In some embodiments, the computer readable medium 136 can be any data storage that can store data, which can thereafter be read by a computer (such as computer 140). In some embodiments, the computer readable medium 136 can be any physical or material medium that can be used to tangibly store the desired information or data or instructions and which can be accessed by a computer 140 or processor 132. In some embodiments, the computer readable medium 136 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 136 can transmit or carry instructions to a remote computer 140 and/or at least one user 131, including a router, private or public network, or other transmission or channel, both wired and wireless. In some embodiments, the software application modules 138 can be configured to send and receive data from a database (e.g., from a computer readable medium 136 including data sources 137a and data storage 137b that can comprise a database), and data can be received by the software application modules 138 from at least one other source. In some embodiments, at least one of the software application modules 138 can be configured within the computer system 110 to output data to at least one user 131 via at least one graphical user interface rendered on at least one digital display.

In some embodiments, the computer readable medium 136 can be distributed over a conventional computer network via the network interface 135a where the system embodied by the computer readable code can be stored and executed in a distributed fashion. For example, in some embodiments, one or more components of the computer system 110 can be coupled to send and/or receive data through a local area network ("LAN") 139a and/or an internet coupled network 139b (e.g., such as a wireless internet). In some embodiments, the networks 139a, 139b can include wide area networks ("WAN"), direct connections (e.g., through a universal serial bus port), or other forms of computer-readable media 136, or any combination thereof.

In some embodiments, components of the networks 139a, 139b can include any number of personal computers 140 which include for example desktop computers, and/or laptop computers, or any fixed, generally non-mobile internet appliances coupled through the LAN 139a. For example, some embodiments include one or more of personal computers 140, databases 141, and/or servers 142 coupled through the LAN 139a that can be configured for any type of user including an administrator. Some embodiments can include one or more personal computers 140 coupled through network 139*b*. In some embodiments, one or more components of the computer system 110 can be coupled to send or receive data through an internet network (e.g., such as network 139*b*). For example, some embodiments include at least one user 131*a*, 131*b*, is coupled wirelessly and accessing one or more software modules of the system including at least one enterprise application 138 via an input and output ("I/O") 137*c*. In some embodiments, the computer system 110 can enable at least one user 131*a*, 131*b*, to be coupled to access enterprise applications 138 via an I/O 137*c* through LAN 139*a*. In some embodiments, the user 131 can comprise a user 131*a* coupled to the computer system 110 using a desktop computer, and/or laptop computers, or any fixed, generally non-mobile internet appliances coupled through the internet 139*b*. In some embodiments, the user can comprise a mobile user 131*b* coupled to the computer system 110. In some embodiments, the user 131*b* can connect using any mobile computing 131*c* to wireless coupled to the computer system 110, including, but not limited to, one or more personal digital assistants, at least one cellular phone, at least one mobile phone, at least one smart phone, at least one pager, at least one digital tablets, and/or at least one fixed or mobile internet appliances.

FIG. 2 illustrates a publish and subscribe information flowchart according to some embodiments. FIG. 3 illustrates system executed steps between a publisher and subscriber according to some embodiments.

The subject matter described herein are directed to technological improvements to the field of MQTT by executing a system that allows communication between MQTT clients that have different topic name space & message payload formats. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Any text in the drawings is part of the system's disclosure and is understood to be readily incorporable into any description of the metes and bounds of the system. Any functional language in the drawings is a reference to the system being configured to perform the recited function, and structures shown or described in the drawings are to be considered as the system comprising the structures recited therein. Any figure depicting a content for display on a graphical user interface is a disclosure of the system configured to generate the graphical user interface and configured to display the contents of the graphical user interface. It is understood that defining the metes and bounds of the system using a description of images in the drawing does not need a corresponding text description in the written specification to fall with the scope of the disclosure.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system. The phrase "configured to" also denotes the step of configuring a structure or computer to execute a function in some embodiments.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. All flowcharts presented herein represent computer implemented steps and/or are visual representations of algorithms implemented by the system. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the invention can also be defined as a machine that transforms data from one state to another state. The data can represent an article, which can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

I claim:

1. A system for enabling communication between Message Queuing Telemetry Transport (MQTT) publishers and MQTT subscribers using different communication formats comprising:

one or more computers comprising one or more processors and one or more non-transitory computer readable media, the one or more non-transitory computer readable media having program instructions stored thereon that when executed cause the one or more computers to:

receive, at a broker device, a first topic-payload in a first hard coded format from a first publisher device executing during runtime in a first runtime environment, the first hard coded format being compatible with a first subscriber device and incompatible with a second subscriber device, the first topic-payload comprising a first topic and a first payload;

transmit, by the broker device, the first topic-payload in the first hard coded format to a transformation element associated with a broker device, the transformation element executing a transformation operation that transforms the first hard coded format to a second format compatible with the second subscriber device, the transformation operation occurring outside the first runtime environment and during the runtime on the first publisher device;

receive, by the broker device, the first topic-payload in the second format, the second format being compatible with the second subscriber device; and transmit, by the broker device, the first topic-payload in the first hard coded format to the first subscriber device and the first topic-payload in the second format to the second subscriber device.

2. The system of claim 1,
wherein the first subscriber device is subscribed to the broker in the first hard coded topic-payload format for to receive the first topic-payload, and the second subscriber device is subscribed to the broker in the second format to receive the first topic payload.

3. The system of claim 2,
wherein the first publisher enables a user to define the first hard coded topic-payload format for transmitting the first topic-payload, the first hard coded topic payload format being unmodifiable by the first publisher device while the first publisher device is executing.

4. The system of claim 1,
wherein a transformation file associated with the transformation element is modified while the first publisher device is executing in the first publisher runtime environment
and executes the transformation operation.

5. The system of claim 1, further comprising
receive, at the broker device, a third topic-payload in a third topic payload format from a third subscriber.

6. The system of claim 5,
wherein the first subscriber is configured to receive the first topic-payload in the first topic-payload format and cannot be modified while executing in a first subscriber runtime environment,
the second subscriber is configured to receive the first topic-payload in the second topic-payload format and cannot be modified while executing in a second subscriber runtime environment, and the third subscriber is configured to receive the third topic payload in a third topic payload format and cannot be modified while executing in the third subscriber runtime environment.

7. The system of claim 1,
wherein the transformation operation comprises a parsing operation.

8. The system of claim 7,
wherein the parsing operation is configured to:
identify, by the one or more processors, one or more topics and one or more payloads in the first topic-payload format;
parse, by the one or more processors, the topic-payload format into one or more topics and one or more payloads;
generate, by the one or more processors, the second topic-payload format using the parsed first topic-payload format.

9. A system for enabling communication between Message Queuing Telemetry Transport (MQTT) publishers and MQTT subscribers using different communication formats comprising:
one or more computers comprising one or more processors and one or more non- transitory computer readable media, the one or more non-transitory computer readable media having program instructions stored thereon that when executed cause the one or more computers to:
receive a first topic-payload in a first hard coded format from a first publisher device executing in a first runtime environment, the first hard coded format being compatible with a first subscriber device and incompatible with a second subscriber device, the first topic-payload comprises multiple topics and payloads;
parsing the first topic-payload from the first hard coded format to separate the multiple topic and payloads within the first topic-payload;
executing a transformation operation that transforms each of the multiple topics and payloads in the first hard coded format to at least a second format compatible with the second subscriber device outside the first runtime environment and during runtime on the first publisher device; and
transmit, by the broker device, the first topic-payload and each of the multiple transformed topics and payloads in different formats to the first publisher device for publishing to subscribers associated with the different formats, wherein at least one of the different formats is a second format associated with a second subscriber.

10. The system of claim 9,
wherein the first subscriber device is subscribed to receive the first topic-payload in the first hard coded topic-payload format, and the second subscriber device is subscribed to receive the first topic payload in the second format.

11. The system of claim 9,
wherein the first publisher enables a user to define the first hard coded topic-payload format for transmitting the first topic-payload, the first hard coded topic payload format being unmodifiable by the first publisher device while the first publisher device is executing.

12. The system of claim 9,
wherein at least one of the different formats is a third format associated with a third subscriber.

13. The system of claim 12,
wherein the first subscriber is configured to receive the first topic-payload in the first topic- payload format and cannot be modified while executing in a first subscriber runtime environment,
the second subscriber is configured to receive the first topic-payload in the second topic- payload format and cannot be modified while executing in a second subscriber runtime environment, and the third subscriber is configured to receive the third topic payload in a third topic payload format and cannot be modified while executing in the third subscriber runtime environment.

* * * * *